United States Patent Office 3,796,778
Patented Mar. 12, 1974

3,796,778
METHOD FOR PREPARING FIBROUS POLYOLEFIN MATERIALS
Lawrence Vincent Gallacher, East Norwalk, Conn., assignor to American Cyanamid Company, Stamford, Conn.
Original application May 1, 1969, Ser. No. 820,761. Divided and this application Feb. 16, 1971, Ser. No. 115,733
Int. Cl. B29d 27/00
U.S. Cl. 264—49    5 Claims

ABSTRACT OF THE DISCLOSURE

An extensively fibrillated thermoplastic resin material and method for preparing the same is given whereby a solid particulate thermoplastic resin which is insoluble in a selected leaching solvent is mixed and fibrillated under heat and pressure with another thermoplastic resin which is soluble in the selected leaching solvent. Following fibrillation, the resin mixture is subsequently contacted with the selected leaching solvent to remove the soluble resin thereby leaving an extensively fibrillated thermoplastic resin product which may be used as a synthetic fabric, and in other industrial applications.

---

This is a division of application Ser. No. 820,761, filed May 1, 1969 and now abandoned.

This invention relates to new and novel synthetic materials and a method for preparing the same. More particularly, it relates to novel extensively fibrillated synthetic material of unique structure.

Thermoplastic materials are known and used in many different and unique forms. One such form having many valuable uses is the pore-type which includes particulate and fibrous pore formers. In the current technology several different types of methods may be employed if this form of final thermoplastic product is desired.

One such method employs the mixing of a thermoplastic resin with the pore forming material followed by the subsequent removal of the pore forming material leaving a porous resin product. Another method involves the pressing and sintering of thermoplastic resin particles to form micropores in the interstices between the particles. Yet another method provides for the dispersing of an inert matrix material which is compacted and densified with the thermoplastic resin during a sintering operation and subsequently extracted thus leaving the porous thermoplastic material. Unfortunately the final product produced by many of these prior art methods is generally poor in quality and has low mechanical strength and low pore volume characteristics in addition to poor uniformity of product.

It is therefore an object of this invention to provide a new and novel material. A prime object is to provide a new and novel fibrous material which has good mechanical strength and handling characteristics. Another object is to provide a novel method for producing the new extensively fibrillated material. Yet another object is to provide a novel product and process for making an extensively fibrillated thermoplastic fabric or leather-like mat or web-type structure which has many uses. Additional objects and advantages will appear to those skilled in the art from the ensuing specification and examples.

The present invention is concerned with the addition of a primary solid particulate thermoplastic resin which is characterized by being insoluble in a selected leaching agent or solvent to a secondary thermoplastic resin which serves as a dispersing matrix and is characterized by being soluble in the selected leaching agent or solvent. It has been surprisingly found that if these resins are mixed and subjected to shear action at temperatures above or just slightly below the melting point of the primary resin, a fibrous or fibrillated mat or web-type structure is formed by the primary resin. If the material is compressed, a higher degree of fibrillation occurs in the structure with enhanced properties and improved permeability. This fibrillated structure of the primary resin in the secondary resin matrix can then be leached with the selective solvent which removes the secondary resin leaving behind the extensively fibrillated or webbed type structure.

The novel extensively fibrillated or webbed type structure of this invention may more precisely be characterized as having the form of a nearly continuous and integral three dimensional network or structure containing interconnected ligaments. This structure is essentially the same for all semicrystalline thermoplastic polymers such as polyolefins, polyesters, polyamides and others when fibrillated according to this invention. FIGS. 1 thru 4 of fibrillated isotactic polypropylene and FIGS. 6A, 6B and 6C of fibrillated poly(1-butene) shown at increasing magnifications are representative of the type structure found from this invention. Identically similar structures are achieved when two or more semicrystalline thermoplastic polymers are fibrillated.

More specifically, a fiber-forming semi-crystalline thermoplastic resin such as, for example, polyethylene, polypropylene, poly(1-butene), poly(4-methyl pentene), poly(glycolic acid), poly(ethylene terephthalate), poly(hexamethylene sebac amide), certain other polyamides, or mixtures of these or other semicrystalline thermoplastic polymers is dispersed in a resin matrix such as, for example, poly(methyl methacrylate), polystyrene, poly(vinyl acetate), polyurethanes and others, either plasticized or unplasticized, at a temperature above the melting point of the thermoplastic resin. The secondary resin is conveniently selected on the basis of its solubility in a selected solvent as opposed to the insolubility of the fiber-forming semicrystalline thermoplastic resin the same select solvent and the workable temperature of the secondary resin. It is important that the secondary resin be workable at the temperature selected and comparable in melt viscosity to the fiber-forming component at the working temperature. Thus, for example, if polyethylene is selected as the fiber-forming semicrystalline thermoplastic resin and poly(methyl methacrylate) is selected as the secondary resin forming the resin matrix, the working temperature of the dispersion should be from about 145° C. to about 210° C.

Further, the chemical natures of the matrix and fibrillator are important, for the interactions of the two phases at their interface depend upon them. It is for this reason, it is believed, that polystyrene and poly(methyl methacrylate) matrices impart different properties to poly(1-butene), and polyolefin fibrillator materials are improved when the poly(methyl methacrylate) matrix is modified with poly(ethylene oxide).

Dispersion, mixing, and blending may be accomplished on a two-roll mill or other conventional high shear mixing device. Once the resin blend is uniform and the mixing complete, the temperature may be lowered so that continued milling under shear stress will cause the orientation and fibrillation of the thermoplastic resin. Alternatively, after mixing is complete, the resin-matrix mixture can be compressed, extruded, or treated in any other conventional way to achieve shear within the matrix thus causing the orientation and fibrillation of the thermoplastic resin.

Subsequently, the prepared resin matrix mixture is treated with an appropriate leaching solvent such as, for example, toluene, acetone, ethylene dichloride, methylene chloride, methyl alcohol, or other appropriately selected solvents which extract, leach, or dissolve the secondary resin or resin matrix thus leaving the fibrillated product. This extraction may be carried out by any conventional manner such as soaking or spraying and may be accelerated by heat providing, however, that care be taken to maintain the fibrillated structure.

Figure 1:
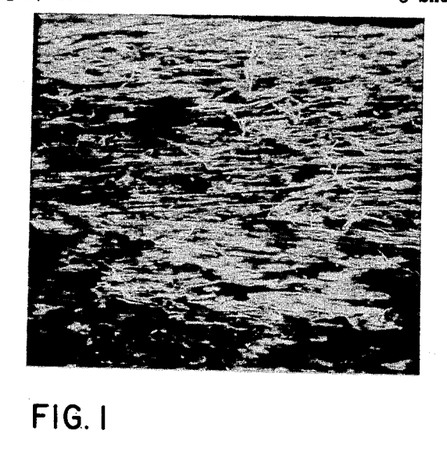
Figure 2:
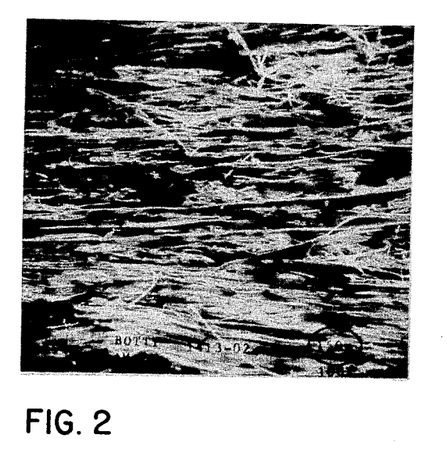
Figure 3:
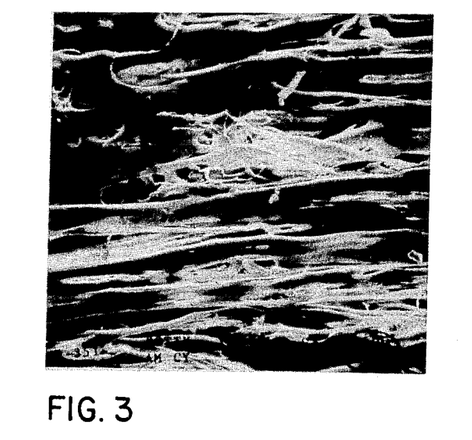
Figure 4:
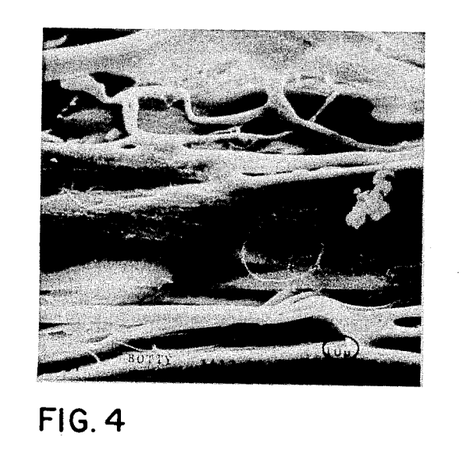
Figure 5:
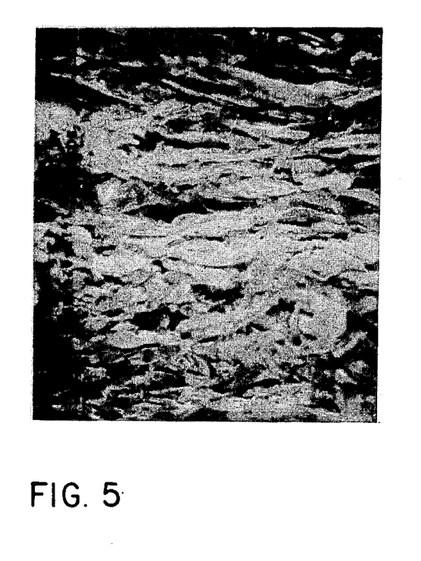

The fibrous mat or web-type structure of this invention does not contain extruded filaments or uniform pores but rather contains and is made up of a web of oriented, interconnected, directional fiber-like strands, membranes, branched ribbons, and fibrils. This fibrillar structure is shown by the photomicrographs of FIGS. 1 through 5 where the surface of an extensively fibrillated isotactic polypropylene sheet is shown at a magnification of 50× in FIG. 1, 100× in FIG. 2, 300× in FIG. 3, and 1000× in FIG. 4. FIG. 5 is a 300× view of a fracture surface of the same material brittle fractured in a plane perpendicular to the direction of shear, illustrating the ribbon like nature of the fibrillated material. All of these micrographs were made using conventional scanning electron microscopy on fully extracted materials.

It is believed that the unique structure of this invention, the extensively fibrillated web or mat type structure, is a function of the transmission of applied stress and shear forces of the roll mill, compression, or extrusion and additionally the temperature of the resin-matrix mixture during fibrillation. Thus, if a resin-matrix mixture is processed on a high shear device, low temperature processing at temperatures from about 15 centigrade degrees below the melting point to about the melting point of the thermoplastic resin will produce highly oriented web mat-type fiber structures which have low permeability. Processing at a temperature to about 90 centigrade degrees above the melting point will result in products of less fibrillation and higher permeability. Thus, as temperature increases, the fibrillation decreases and conversely, the permeability increases. It should be noted that tensile strength properties improve with the lowering of processing temperatures below the melting point of the thermoplastic resin. The orientation we claim here is primarily at the fibril level with relatively little molecular orientation except where fibrillation is induced at or below the melting point.

The extensively fibrillated and novel structure of this invention can be used as a synthetic fabric or leather, a porous substrate in batteries or fuel cells, a filter or other industrial membrane, in bandages and other medical uses, and additionally has many applications in molding and extrusion situations.

Another unique feature of this process is that non-leachable polymeric fillers composed of fibrous or particulate polyethylene terephthalate, polyacrylonitrile, polyurethanes and other polymers may be incorporated into the matrix in the dispersion step. Additionally other organic or inorganic fillers such as, for example, soluble organic dyes, coloring pigments, carbon black, calcium carbonate, iron oxide, and other fillers may be added. Although binders and other materials may be initially added to the mix before forming the fibered structure, the unique process and properties of the product of this invention are achieved without fillers, additional binders, or internal bonding of the fibers after extraction.

As mentioned above, before extraction the material can be extruded, laminated to fabrics, or shaped into useful forms which remain after the extraction step. However, the final formed product may also be subsequently treated, cut, formed, or worked in a manner such as not to destroy the fibrillated structure. Additionally, the final product can be used with or bonded to substrates, such as cloth, metals, plastics, and other useful materials.

In order that the present invention may be more fully understood, the following examples are set forth by way of illustration. No specific detail or enumeration contained therein should be construed as limitations on the present invention excepting so far that they appear in the appended claims. All parts and percentages are by weight unless otherwise as specifically designated.

EXAMPLE 1

Sixty parts of molding grade poly(methyl methacrylate) pellets, twenty parts of powdered high molecular weight poly(ethylene oxide) and thirty parts of linear polyethylene pellets were blended in the same order on a two roll rubber mill with the rolls steam-heated to maintain the roll surfaces at 170° C. This temperature is well above the melting or softening points of each of the components, so that the mixture rapidly formed a visually uniform melt. After a uniform blend was obtained, milling was continued for another 5 minutes at the highest speed setting (50 r.p.m. on the faster roll, 36 r.p.m. on the slower one) to ensure intimate mixing of the components and to induce an orientation and partial fibrillation of the polyethylene. The blend was removed from the mill as a thick sheet and cut into plaques approximately 4 inches square. The plaques were pressed at 170° C., and then cooled under pressure to form sheets .035" thick. The sheets were immersed at 25° C. in a lightly agitated methylene chloride bath, which extracted substantially all (99%) of the poly(methyl methacrylate)/poly(ethylene oxide) matrix within three hours.

The resulting product was a soft, white sheet with a leathery appearance. Electron microscopy revealed a structure of entangled fibers and ribbons similar to that in FIG. 3 with fiber diameters of a few microns. Water vapor transmission proved to be high: 1400 gram-mils/24 hours-100 inch$^2$, using ASTM Method E–96, Procedure B. Permeability to air was measured with the Curley densometer, and was very high: 40 seconds for the passage of 100 cc. of air through a 1 square inch area with a pressure differential of 0.013 atmosphere. Tensile properties were quite directional, with an average tensile strength of 200 p.s.i.

When the original plaques cut from the milled sheet were extracted in solvent without being pressed, and were subsequently examined microscopically, it was found that the primary structure consisted of oriented unidirectional ribbons and fibrils with much larger lateral dimensions than those in the pressed sheets. Thus, the pressing step results in an increase in the degree of fibrillation and in the entanglement of the fibrils.

The poly(ethylene oxide) in the formulation improves the blending of the polyethylene and poly(methyl methacrylate) and plasticizes the poly(methyl methacrylate) so that it can be milled at lower temperatures. Further, sheets of the blend containing poly(ethylene oxide) can be handled and flexed easily at room temperature.

EXAMPLE 2

The same composition described in Example 1 was processed in the same way except that once a uniform blend was achieved on the mill at 170° C., the roll surfaces were allowed to cool below the melting point of the polyethylene, to 125° C. while milling continued. The result was that the polyethylene began to crystallize on the mill while being sheared. Some of the plaques formed in this manner were pressed at 125° C. and extracted in methylene chloride to yield a somewhat stiffer sheet than that described in Example 1. The tensile strengths of the sheets were 2200 p.s.i. and 500 p.s.i. with and across the grain, respectively, and the passage time for 100 cc. of air was 800 seconds.

The rest of the plaques were pressed at 170° C. and then extracted. The resulting sheets were quite similar in appearance and in physical properties to those of Example 1, indicating that the orientation effects achieved by milling at low temperatures were reversed by pressing at 170° C., 30° C. above the melting point of the polyethylene.

EXAMPLE 3

The composition described in Example 1 was pre-blended and pelletized using a twin-screw extruder. The blend was then extruded in a single-stage, single-screw extruder through a .030" x 4" sheet die, with a stock temperature in the die of 200° C. to produce a continuous sheet using a conventional sheet take-off system.

The sheet was extracted in methylene chloride as described in Example 1 to yield a soft, white sheet consisting principally of highly fibrillated polyethylene with fiber diameters averaging 3–5 microns.

EXAMPLE 4

The sheet extruded in Example 3 was pressed at 170° C. to form a .035" sheet and subsequently extracted in methylene chloride, yielding a fibrillar sheet with a softer hand and higher permeability than the unpressed material.

EXAMPLE 5

Eighty parts of a pelletized general purpose polystyrene was blended with twenty parts of high density polyethylene on a two roll mill at 170° C. for 10 minutes. The blend was removed from the mill in the form of a thick sheet, which was then cut into plaques approximately 4 inches square. These plaques were pressed at 170° C. and then cooled under pressure to form sheets .035 inches thick. The polystyrene matrix was extracted in an agitated toluene bath, yielding a fairly stiff, leathery white sheet. Microscopic examination of this sheet showed a dense, entangled fibrillar structure. The material possessed a tensile strength of 390 p.s.i., with no significant orientation effects, and was highly permeable to air, with an airflow time of 480 seconds.

EXAMPLE 6

When the components blended in Example 5 were processed in the same way, but using different proportions, the behavior and properties were found to vary systematically with composition. In general, as the polyethylene content was raised, the tensile strength and stiffness went up, the permeability decreased, and the time of extraction increased. The results are summarized in Table I below.

TABLE I

| Percent polyethylene in PE/PS blend | Toluene extraction | Tensile strength, p.s.i. | Flow time, Curley densiometer, sec. |
|---|---|---|---|
| 10 | Disintegrated | | |
| 20 | Fast | 390 | 480 |
| 35 | do | 580 | 608 |
| 50 | Incomplete after 24 hours | 1,230 | |

EXAMPLE 7

Forty parts of a pelletized low density polyethylene was blended with sixty parts of polystyrene on a two roll mill at 150° C. The material was removed from the mill and cut into plaques approximately 4 inches square. The plaques were pressed at 170° C. to yield .035 inch sheets, which were subsequently extracted in toluene to yield soft, flexible fibrillar sheets with a tensile strength of 310 p.s.i. and an air flow time of 700 seconds.

EXAMPLE 8

Figure 6A:
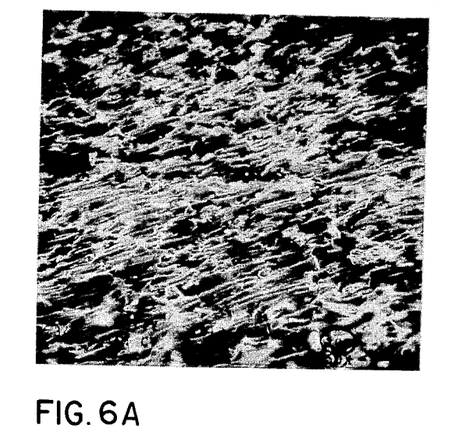
Figure 6B:
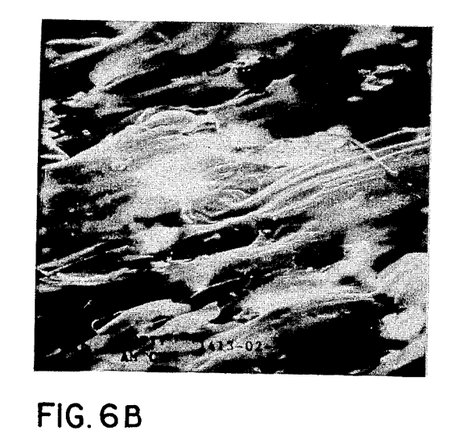
Figure 6C:
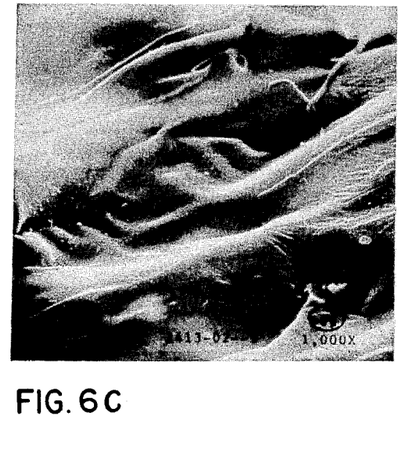

Sixty parts of molding grade poly(methyl methacrylate), twenty parts of high molecular weight poly(ethylene oxide), and thirty parts of isotactic poly(1-butene) were blended on a two roll mill at 170° C. for 10 minutes. The material was removed from the mill as a sheet and cut into 4 inch square plaques. These plaques were pressed into sheets at 170° C. and then extracted in an agitated methylene chloride bath. The product was an extremely soft, highly fibrillated sheet. The microstructure of this material is shown in FIGS. 6A, 6B, and 6C which were taken of the top surface using scanning electron microscopy at 50×, 300×, and 1000× respectively.

EXAMPLE 9

Figure 7A:
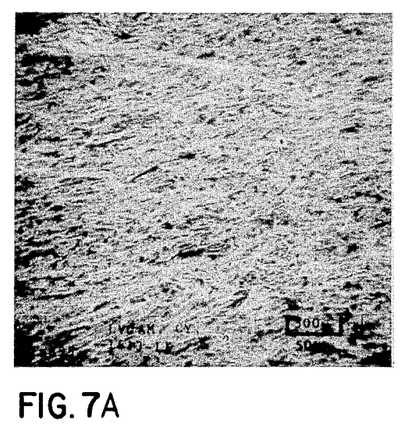
Figure 7B:
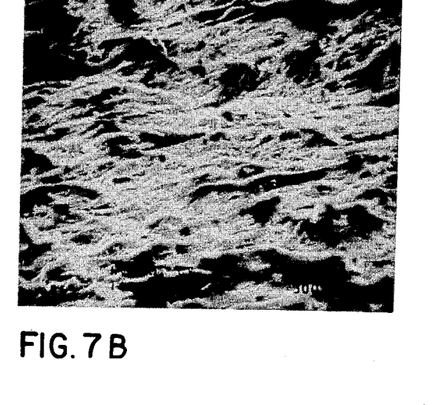
Figure 7C:
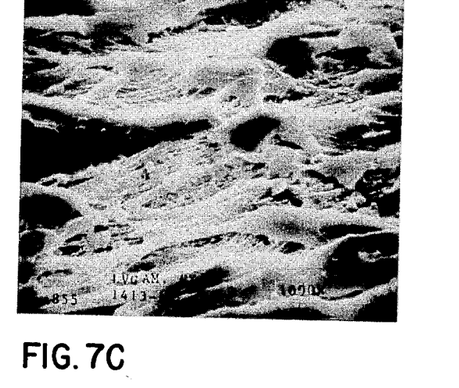

A blend of 60 parts of poly(methyl methacrylate), 20 parts high molecular weight poly(ethylene oxide), 3 parts poly(tetrafluoroethylene) in an aqueous dispersion and 27 parts of isotactic poly(1-butene), (all ingredients as in Example 8 except as noted) was made on a two roll mill at 170° C. The material was removed and cut into plaques as in the other examples, and these were pressed at 170° C. to form .035 inch sheets, cooled under pressure, and extracted in an agitated methylene chloride bath for two hours. This procedure removed over 99% of the poly(methyl methacrylate) and poly(ethylene oxide), leaving an extremely soft, highly fibrillated sheet with the appearance and hand of fine glove leather. The tensile strength of this material was 450 p.s.i., the air flow time 550 seconds, and the water vapor transmission 1000 gram-mills/24 hours-100 in.$^2$. Examination of this material using scanning electron microscopy revealed the structure shown in FIGS. 7A, 7B, and 7C, with a much finer fiber structure and a general enhancement of the fibrillation and entanglement caused by the poly(tetrafluoroethylene). These figures are to be compared with FIGS. 6A, 6B, and 6C based on Example 8. The mechanism for this enhancement is complex. The poly(tetrafluoroethylene) itself fibrillates in the matrix as a crystalline polymer via a cold-drawing response. Further, it is well known that poly(tetrafluoroethylene) fibers greatly increase the melt elasticity and therefore the microscopic stress level in sheared polymer melts. Also, finely subdivided poly(tetrafluoroethylene) is an extremely effective nucleating agent for the crystallization of certain polyolefins. Contributions from each of these factors will combine to lead to the observed enhancement of the fibrillation of the principle fibrillator, in this case poly(1-butene). Similar effects have been noted in the fibrillation of each of the polyolefins named in these examples and in poly(ethylene terephthalate) as well. Therefore, the phenomenon is a general one and not restricted to the fibrillation of one or two polymers.

EXAMPLE 10

A blend with the same composition as in Example 9 was first blended and pelletized in a twin screw extruder. The pellets were then fed into a single stage 25 L/D extruder with a uniform taper 2:1 compression screw and extruded through a .125 inch sheet die at 190° C. The extruded sheet was pressed to a thickness of .035 inch at 170° C. and this sheet was then laminated directly to a polyester fabric without adhesives by pressing at 170° C. After extraction with methylene chloride, the sheet was found to be substantially identical in appearance to the sheet produced in Example 9, except that it was now bonded directly to the polyester fabric and now possessed the tensile and tear properties of the fabric. Examination of the bond showed that the fibrillar polymer had actually penetrated and entangled with the fibers in the fabric to produce the bond.

EXAMPLE 11

Eighty parts of general purpose polystyrene, 3 parts poly(tetrafluoroethylene) and 27 parts of isotactic poly-(1-butene) were milled on a two roll mill at 130° C. for 10 minutes. The blend was removed from the mill and cut into 4 inch square plaques which were then pressed at 130° C. to form sheets .035 inch thick. These were extracted in toluene at room temperature to yield highly fibrillar sheets somewhat stiffer than those described in Example 9. The tensile strength was 1300 p.s.i. and air flow time approximately 3700 seconds. Thus, the use of the polystyrene matrix instead of the poly(methyl methacrylate)/poly(ethylene oxide) matrix resulted in a product with different characteristics.

EXAMPLE 12

A blend with the same composition as Example 11 was prepared on a two roll mill at 130° C. While milling continued, 27 parts of powdered calcium carbonate filler was gradually added and milled into the blend. Plaques were prepared and pressed at 130° C. to yield sheets, which were then extracted in toluene at room temperature. The sheets retained substantially all of the calcium carbonate after extraction, and further, it could not be removed or detected by rubbing or other surface contact.

Beside affecting the esthetic qualities of the extracted sheets, the filler had a profound effect on the speed of extraction and the physical properties as well. The extraction was accelerated in the presence of filler and this was paralleled by an increase in permeability to air. The physical properties are given in Table II below.

TABLE II

| CaCO₃, pbw. per pbw. poly(1-butene) | Air flow, seconds (Gurley densometer) | Tensile strength, p.s.i. |
|---|---|---|
| 0 | 3,800 | 1,200 |
| 1 | 660 | 770 |
| 2 | 830 | 580 |

EXAMPLE 13

Seventy parts of a molding grade poly(methyl methacrylate), 10 parts of high molecular weight poly(ethylene oxide) and 30 parts of isotactic polypropylene all in pellet or powder form, were blended and pelletized in a twin screw extruder. The pellets were fed into a single stgae 25/1 L/D extruder with a uniform taper screw having a 2:1 compression ratio. The blend was extruded through a sheet die with a .030 inch opening while the stock temperature in the die was maintained at 210° C. The extrudate was extracted directly to yield a sheet of highly fibrillated polypropylene, with the bulk of the material consisting of small fibrils approximately 5 microns in diameter, mostly oriented in one direction, and ribbon-like structures in various stages of breaking down into fibrils.

A quantity of the extruded sheet was compressed to half its original thickness at 170° C., cooled under pressure, and extracted. The extracted sheet was softer than the original unpressed sheet, showed increased fibrillation on a microscopic scale, and higher permeability to air.

EXAMPLE 14

A blend of 1 part of isotactic poly(4-methyl pentene) and 3 parts of poly(methyl methacrylate) was prepared and pelletized using a twin screw extruder. The pellets were fed into a single screw extruder identical to the described in Example 13, with the stock temperature in the die maintained at 260° C. The .030 inch extruded sheet was extracted in methylene chloride for one hour to remove the poly(methyl methacrylate) matrix, leaving a soft, white, microfibrillar sheet of poly(4-methyl pentene). The fibrillar sheet was similar in appearance to the polypropylene sheet produced in Example 13.

EXAMPLE 15

A blend of 25 parts of poly(glycolic acid), and 75 parts of molding grade poly(methyl methacrylate) was preblended, pelletized, and extruded into sheet form exactly as described in Example 14. The product was extracted in acetone to dissolve the poly(methyl methacrylate) matrix, leaving a sheet of extensively fibrillated poly(glycolic acid). Examination of the product showed the structure to consist primarily of fibrillar semicontinuous ribbons, not completely broken down into the ultimate fibrils, but with the capacity to adsorb water readily.

EXAMPLE 16

A blend of 25 parts of poly(hexamethylene sebac amide) and 75 parts of molding grade poly(methyl methacrylate) was preblended, pelletized and extruded into sheet form exactly as described in Example 14. The product was extracted in methylene chloride, leaving a sheet of fibrillated poly(hexamethylene sebac amide) similar in appearance to the product in Example 15.

EXAMPLE 17

Eighty parts of pelletized molding grade poly(methyl methacrylate) was placed on a two roll mill maintained at 170° C. and milled until smooth. Thirty parts of the polyamide of 12-aminododecanoic acid pellts was gradually added while milling. Milling was continued for 5 minutes after the blend appeared homogeneous in order to achieve maximum orientation and fibrillation of the polyamide. The blend was taken off the mill and cut into 4 inch square paques. These were then pressed at 170° C. to form sheets, cooled, and extracted in methylene chloride to remove the matrix. The resulting sheet was tough and leathery, and consisted of highly fibrillated structure of the polymadie of 12-aminododecanoic acid.

EXAMPLE 18

Seventy parts of poly(methyl methacrylate) and 30 parts of pelletized poly(ethylene terephthalate) were blended and pelletized with a twin screw extruder. This blend was then extruded into sheet form exactly as described in Example 14. The product was extracted in acetone to yield a sheet of highly fibrillated poly(ethylene terephthalate).

In the course of doing this work, it became apparent that the melt behavior of the matrix is important, in that the stress level imparted to the fibrillator component, and therefore the degree of melt orientation and fibrillation, is roughly proportional to the melt viscosity of the matrix. Thus, when the procedures performed in Examples 14 and 15 were carried out with a lower molecular weight grade of poly(methyl methacrylate), with approximately 40% of the melt viscosity of the grade specified, the extracted product was much weaker and less desirable.

EXAMPLE 19

Sixty parts of poly(methyl methacrylate), 30 parts of high density polyethylene, and 20 parts of a thermoplastic polyurethane elastomer were blended on a two roll mill at 170° C. for 10 minutes. The material was removed from the mill and cut into plaques. These plaques were pressed into .015 inch sheets at 170° C. The sheets were soaked in an agitated methylene chloride bath at 75° F. to completely dissolve the poly(methyl methacrylate) leaving behind extremely tough, abrasion resistant sheets of highly fibrillated polyethylene and polyurethane elastomer.

While the foregoing invention has been described and exemplified in terms of its preferred embodiments, those skilled in the art will readily appreciate that variations can be made without departing from the sphere and scope of the invention.

I claim:

1. A process of forming a porous, flexible, gas-permeable, continuous sheet consisting of an integral network of interconnected ligaments of fiber-forming resin selected from the group consisting of polyethylene, polypropylene, poly(1 - butene), poly(4 - methylpentene) poly(glycolic acid) poly(hexamethylene sebacamide), polyamide of 12-amino-dodecanoic acid, and mixtures thereof, said process comprising blending 20–35 percent by weight of said fiber-forming resin and 80–65 percent by weight of a matrix resin selected from polymethylmethacrylate, polystyrene and mixtures of either of those with plasticizer, high shear mixing of the blended resins at a working temperature from above to just below the melting temperature of said fiber-forming resin thereby forming an interconnected fibrous dispersion of said fiber-forming resin in said matrix resin, shaping the mixture into a sheet and extracting the matrix resin by means of a selective solvent leaving the defined continuous sheet.

2. A process defined by claim 1 wherein the fiber forming resin is poly(1-butene).

3. A process defined by claim 1 wherein the matrix resin is polymethylmethacrylate.

4. A process defined by claim 3 wherein the defined working temperature is about 170° C.

5. A process defined by claim 1 wherein the defined mechanical working step comprises extrusion at the defined working temperature of the blended resins to form a sheet.

References Cited

UNITED STATES PATENTS

| | | | |
|---|---|---|---|
| 3,407,096 | 10/1968 | Landi | 236—120 FCXV |
| 3,407,249 | 10/1968 | Landi | 264—49 |
| 3,594,459 | 7/1971 | Keuchel | 264—DIG. 8 |
| 3,323,978 | 6/1967 | Rasmussen | 264—DIG. 8 |
| 3,511,742 | 5/1970 | Rasmussen | 264—DIG. 8 |
| 3,539,666 | 11/1970 | Schirmer | 264—DIG. 8 |
| 3,556,161 | 1/1971 | Roberts | 264—127 |
| 3,562,369 | 2/1971 | Chopra et al. | 264—DIG. 8 |

FOREIGN PATENTS

| | | | |
|---|---|---|---|
| 1,043,762 | 9/1966 | Great Britain | 264—49 |
| 1,066,061 | 4/1967 | Great Britain | 264—49 |
| 1,098,718 | 8/1955 | France | 264—49 |

PHILIP E. ANDERSON, Primary Examiner

U.S. Cl. X.R.

161—252; 264—DIG. 8, DIG. 47